(12) United States Patent
Kim (10) Patent No.: US 8,766,499 B2
(45) Date of Patent: Jul. 1, 2014

(54) VIBRATION MOTOR

(75) Inventor: Yong Jin Kim, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 117 days.

(21) Appl. No.: 13/441,586

(22) Filed: Apr. 6, 2012

(65) Prior Publication Data

US 2013/0187502 A1  Jul. 25, 2013

(30) Foreign Application Priority Data

Jan. 20, 2012  (KR) .................. 10-2012-0006924

(51) Int. Cl.
*H02K 5/00* (2006.01)
(52) U.S. Cl.
USPC .............................. 310/89; 310/81
(58) Field of Classification Search
USPC .............................. 310/15, 81, 89
See application file for complete search history.

(56) References Cited

U.S. PATENT DOCUMENTS

| | | | |
|---|---|---|---|
| 6,590,991 B1 * | 7/2003 | Maeda ........................ | 381/409 |
| 2002/0163264 A1 * | 11/2002 | Horng et al. ................. | 310/81 |
| 2002/0163265 A1 * | 11/2002 | Horng et al. ................. | 310/81 |
| 2002/0190589 A1 * | 12/2002 | Horng et al. ................. | 310/81 |
| 2003/0227225 A1 * | 12/2003 | Kaneda et al. ............... | 310/81 |
| 2005/0242672 A1 * | 11/2005 | Huang .......................... | 310/81 |
| 2007/0145841 A1 * | 6/2007 | Zhao et al. ................... | 310/81 |
| 2008/0246356 A1 * | 10/2008 | Park ............................. | 310/81 |
| 2012/0169150 A1 | 7/2012 | Lee et al. | |

FOREIGN PATENT DOCUMENTS

| | | |
|---|---|---|
| KR | 10-2010-0019822 A | 2/2010 |
| KR | 10-1047451 A | 5/2010 |
| KR | 2010-0117896 A | 11/2010 |
| KR | 10-1055508 B1 | 8/2011 |
| KR | 10-2011-0099471 A | 9/2011 |

OTHER PUBLICATIONS

Office Action issued in related Korean Application No. 10-2012-0006924, mailed on Dec. 3, 2012.

* cited by examiner

*Primary Examiner* — Thanh Lam
(74) *Attorney, Agent, or Firm* — McDermott Will & Emery LLP (57) ABSTRACT

There is provided a vibration motor including: a housing having one open surface; a permanent magnet disposed in an internal space of the housing and interacting with a coil to generate electromagnetic force; an elastic member formed in the housing; a mass member coupled to the elastic member to perform resonant movement through the electromagnetic force; a cover covering the one open surface of the housing; and an extension part extended from the one open surface of the housing in a height direction thereof and compressed with the cover to closely attach the housing and the cover to each other.

18 Claims, 10 Drawing Sheets

VIBRATION MOTOR

CROSS-REFERENCE TO RELATED APPLICATIONS

This application claims the priority of Korean Patent Application No. 10-2012-0006924 filed on Jan. 20, 2012, in the Korean Intellectual Property Office, the disclosure of which is incorporated herein by reference.

BACKGROUND OF THE INVENTION

1. Field of the Invention

The present invention relates to a vibration motor, and more particularly, to a vibration motor capable of increasing coupling force between a housing and a cover.

2. Description of the Related Art

Generally, a vibration motor has a structure in which a rotor having an eccentric mass with respect to a shaft rotates to produce mechanical vibrations. Here, the rotor rotates by receiving current in a coil thereof through contact between a brush and a commutator.

However, a vibration motor using a brush and a commutator has disadvantages, in that mechanical friction between the brush and the commutator may be high, and electrical sparks may be generated through contact between the brush and the commutator, such that a lifespan of the motor may be shortened.

In addition, a vibration motor having this type of structure is inappropriate for use in an output device requiring a rapid response since it may take a certain amount of time to reach a target oscillation frequency.

As a motor for overcoming these disadvantages, there is provided a linear vibration motor.

The linear vibration motor may allow a mass member fixed to an elastic member, vibrated through electromagnetic force, to relatively rapidly generate a oscillation frequency desired by a user.

The linear vibration motor has a structure in which a housing and a cover are coupled to each other by welding. However, this coupling structure may be disadvantageous, in that a molten material may penetrate into the housing to change vibration characteristics of the linear vibration motor (for example, generate noise therein).

SUMMARY OF THE INVENTION

An aspect of the present invention provides a vibration motor capable of improving coupling force between a housing and a cover without causing a change in vibration characteristics thereof.

According to an aspect of the present invention, there is provided a vibration motor including: a housing having one open surface; a permanent magnet disposed in an internal space of the housing and interacting with a coil to generate electromagnetic force; an elastic member formed in the housing; a mass member coupled to the elastic member to perform resonant movement through the electromagnetic force; a cover covering the one open surface of the housing; and an extension part extended from the one open surface of the housing in a height direction thereof and compressed with the cover to closely attach the housing and the cover to each other.

The extension part may be compressed with the cover by curling.

The extension part may be continuously protruded along an edge of the one open surface of the housing.

The housing may have a step supporting the cover.

The extension part may have a relatively smaller thickness than that of the housing so as to be easily compressed with the cover.

A height h of the extension part may satisfy the following Equation 1:

$$0.13 < h - T2 < 0.50 \quad \text{Equation 1}$$

where T2 indicates a thickness of the cover.

The housing may be formed of stainless steel or a cold rolled steel sheet.

The cover may have an inclined surface contacting an end portion of the extension part in a state in which the cover is coupled to the housing.

The cover may include a protrusion part protruded in a radial direction.

The housing may have a groove into which the protrusion part is fitted.

According to another aspect of the present invention, there is provided a vibration motor including: a housing having one open surface; a permanent magnet disposed in an internal space of the housing and interacting with a coil to generate electromagnetic force; a cover covering the one open surface of the housing; an elastic member formed on the cover; a mass member coupled to the elastic member to perform resonant movement through the electromagnetic force; and an extension part extended from the one open surface of the housing in a height direction thereof and compressed with the cover to closely attach the housing and the cover to each other.

The extension part may be compressed with the cover by curling.

The extension part may be continuously protruded along an edge of the one open surface of the housing.

The housing may have a step supporting the cover.

The extension part may have a relatively smaller thickness than that of the housing so as to be easily compressed with the cover.

A height h of the extension part satisfies the following Equation 1:

$$0.13 < h - T2 < 0.50 \quad \text{Equation 1}$$

where T2 indicates a thickness of the cover.

The housing may be formed of stainless steel or a cold rolled steel sheet.

The cover may have an inclined surface contacting an end portion of the extension part in a state in which the cover is coupled to the housing.

The cover may include a protrusion part protruded in a radial direction.

The housing may have a groove into which the protrusion part is fitted.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

A small-sized vibration motor may receive a permanent magnet and a coil in a space formed by a housing and a cover and generate vibrations having a predetermined frequency through interaction between the permanent magnet and the coil.

Recently, as a magnitude of vibrations required in a portable terminal has gradually increased, and a oscillation frequency band required in the portable terminal has been specified, the development of a small-sized vibration motor having resistance to internal impacts and external impacts has been demanded.

That is, in the case of a small-sized vibration motor according to the related art, a housing and a cover may be separated from each other or may be partially separated from each other due to an internal impact or an external impact, such that it may be difficult to stably obtain a desired oscillation frequency band.

Meanwhile, in consideration of this problem, a scheme of welding a housing and a cover to each other has been proposed. However, this scheme has a problem, in that a material, molten during a welding process, may be introduced into the vibration motor to change characteristics of main components thereof. For example, the molten material introduced into the vibration motor may penetrate a space between a coil and a permanent magnet to thereby cause coil disconnection, thereby leading to a change in characteristics of the vibration motor (generation of noise).

According to embodiments of the present invention, provided to solve these problems, a small-sized vibration motor in which a housing and a cover may be stably coupled to each other may be provided. To this end, according to embodiments of the present invention, the housing and the cover are coupled to each other in a compression scheme (particularly, by curling), such that coupling force between the housing and the cover may be improved.

Particularly, according to embodiments of the present invention, the entire portion in which the housing and the cover are in contact with each other is compressed, such that the coupling force between the housing and the cover may be further improved.

Further, according to embodiments of the present invention, at least one of the housing and the cover is formed of a cold rolled steel sheet, such that a compression state may not be significantly changed due to external force.

Therefore, according to embodiments of the present invention, a joint between the housing and the cover may not be easily deformed due to an internal impact or an external impact, such that a oscillation frequency having a predetermined magnitude may be generated.

Hereinafter, embodiments of the present invention will be described in detail with reference to the accompanying drawings.

In describing the present invention below, terms indicating components of the present invention are named in consideration of functions thereof. Therefore, the terms used herein should not be understood as limiting the technical components of the present invention.

Figure 1:
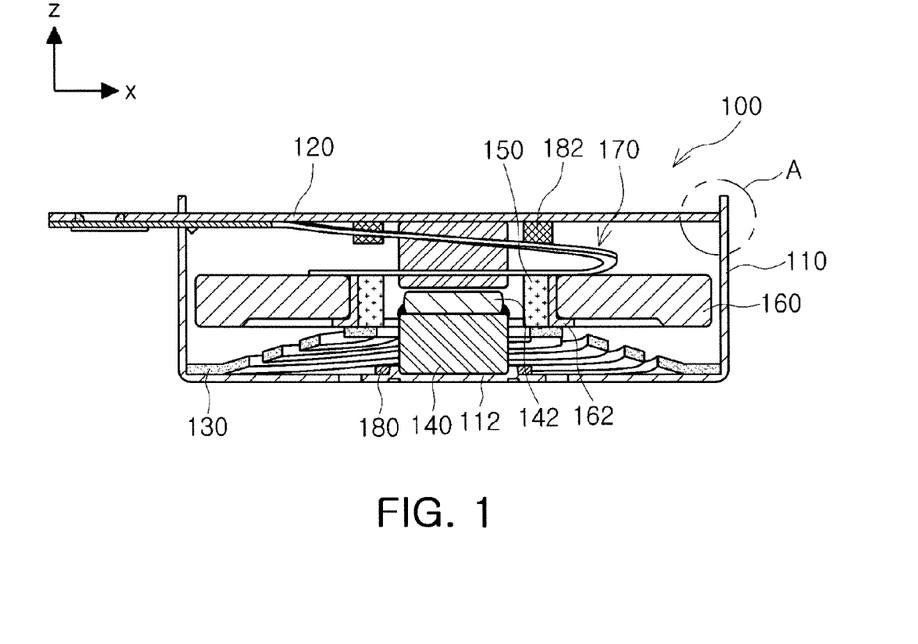
FIG. 1 is a cross-sectional view of a vibration motor according to an embodiment of the present invention.
Figure 2:
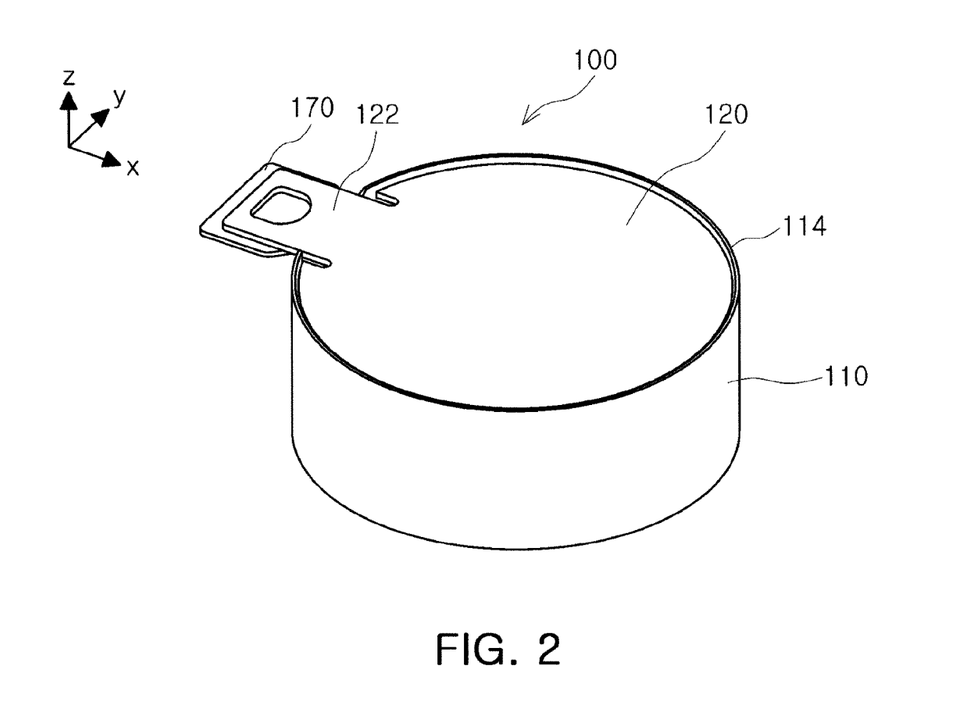
FIG. 2 is an assembled perspective view showing a state of the vibration motor shown in FIG. 1 before curling.
Figure 3:
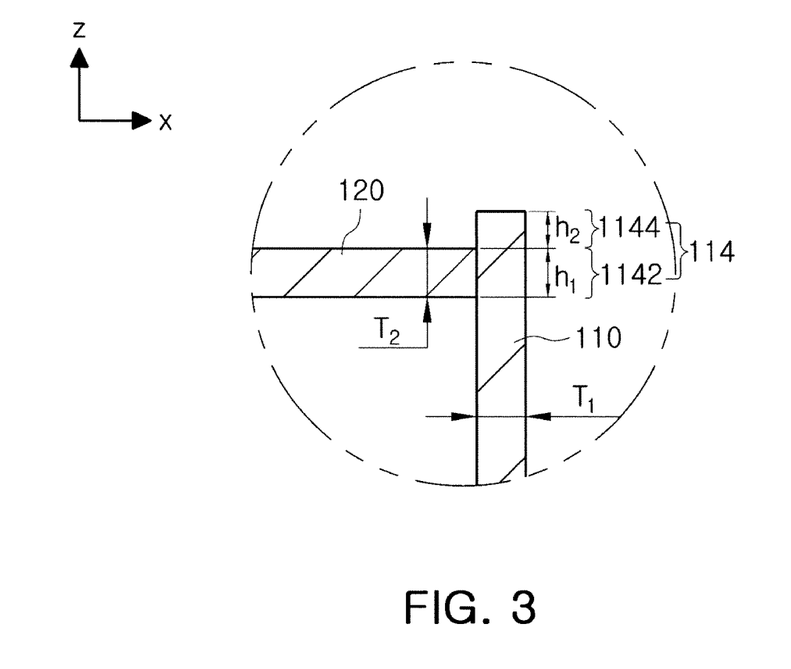
FIG. 3 is an enlarged cross-sectional view of part A shown in FIG. 1.
Figure 4:
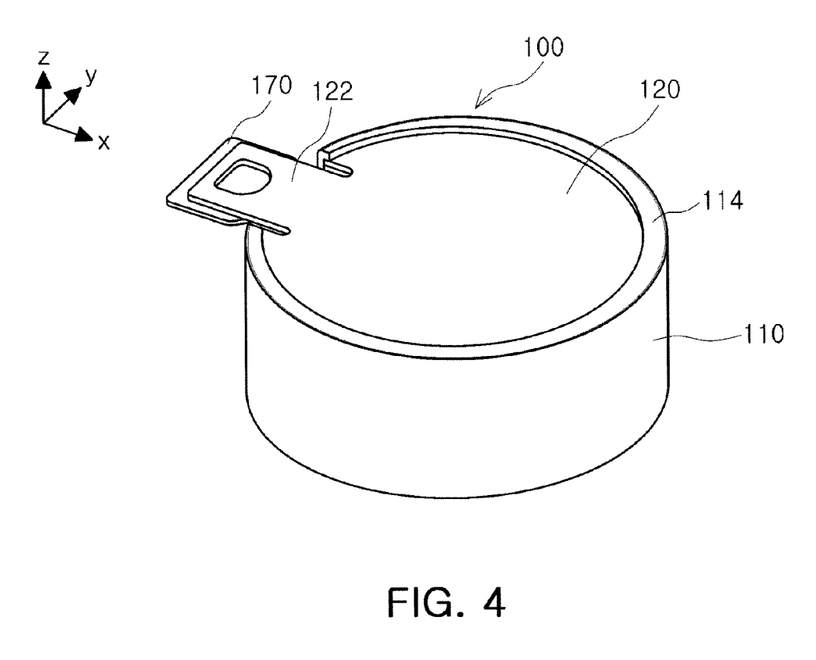
FIG. 4 is an assembled perspective view showing a state of the vibration motor shown in FIG. 1 after curling.
Figure 5:
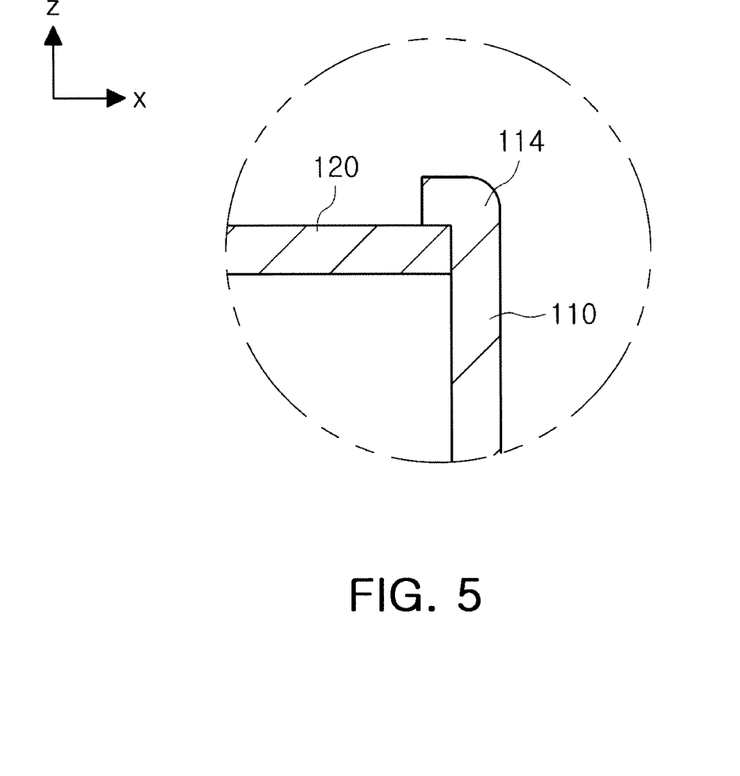
FIG. 5 is an enlarged cross-sectional view showing a state of part A shown in FIG. 1 after curling.
Figure 6:
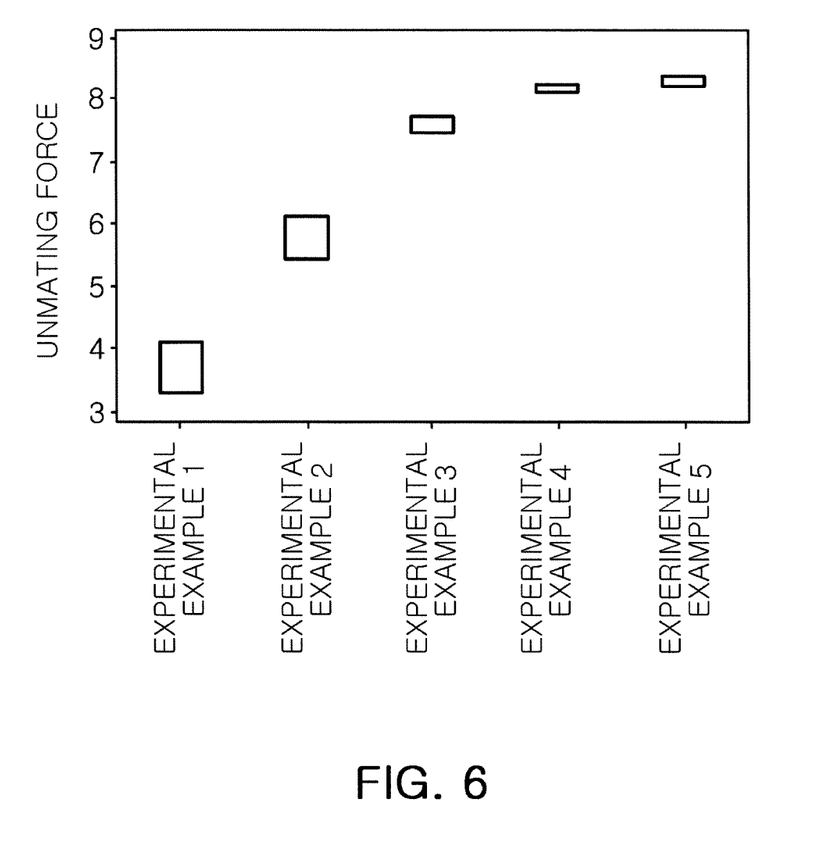
FIG. 6 is a graph showing a relationship between a height of an extension part and unmating force described in Table 2.
Figure 7:
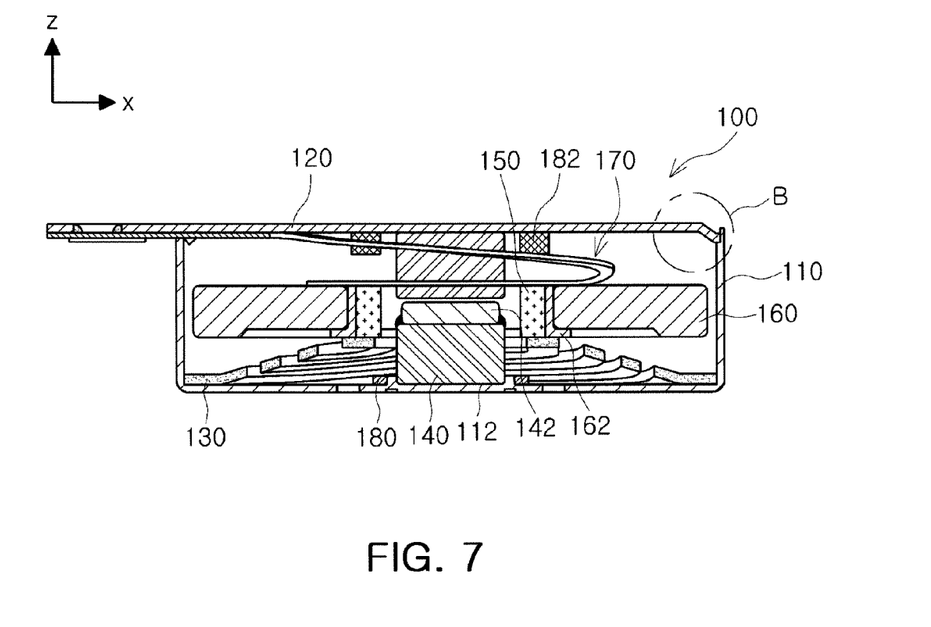
FIG. 7 is a cross-sectional view of a vibration motor according to another embodiment of the present invention.
Figure 8:
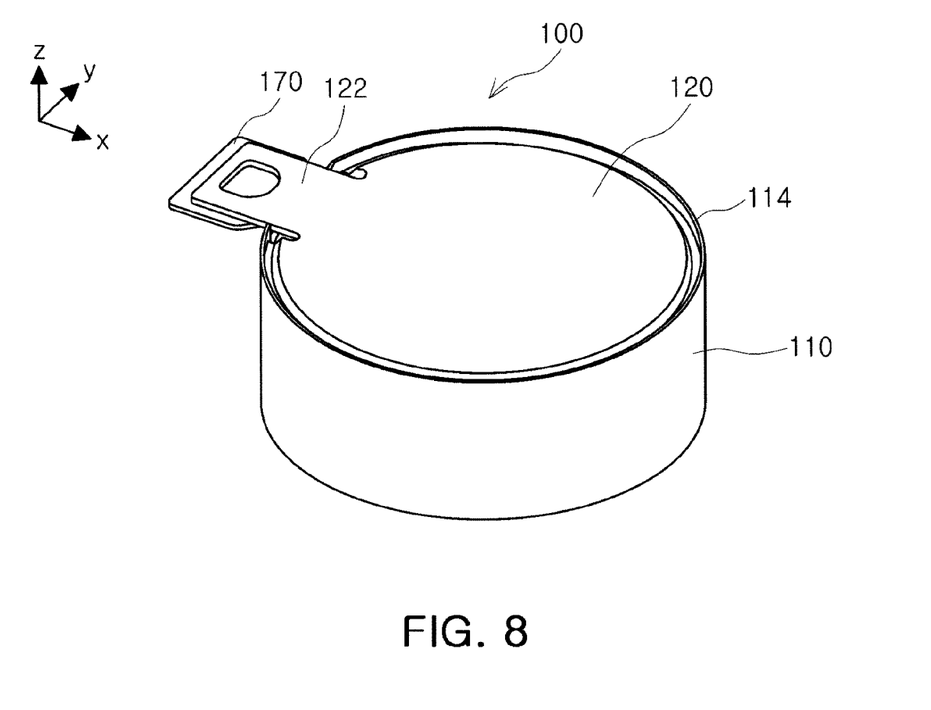
FIG. 8 is an assembled perspective view showing a state of the vibration motor shown in FIG. 7 before curling.
Figure 9:
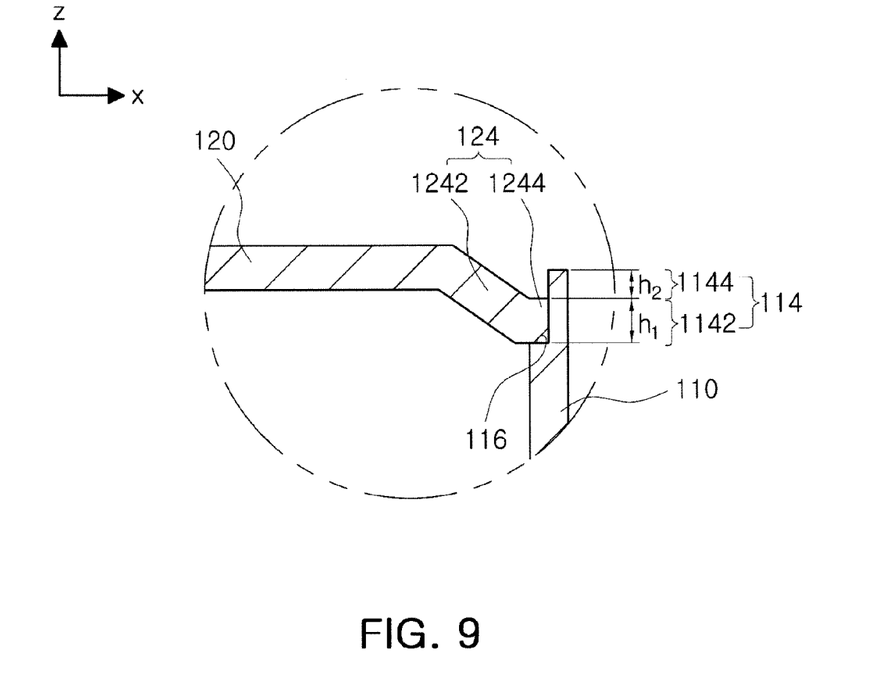
FIG. 9 is an enlarged cross-sectional view of part B shown in FIG. 7.
Figure 10:
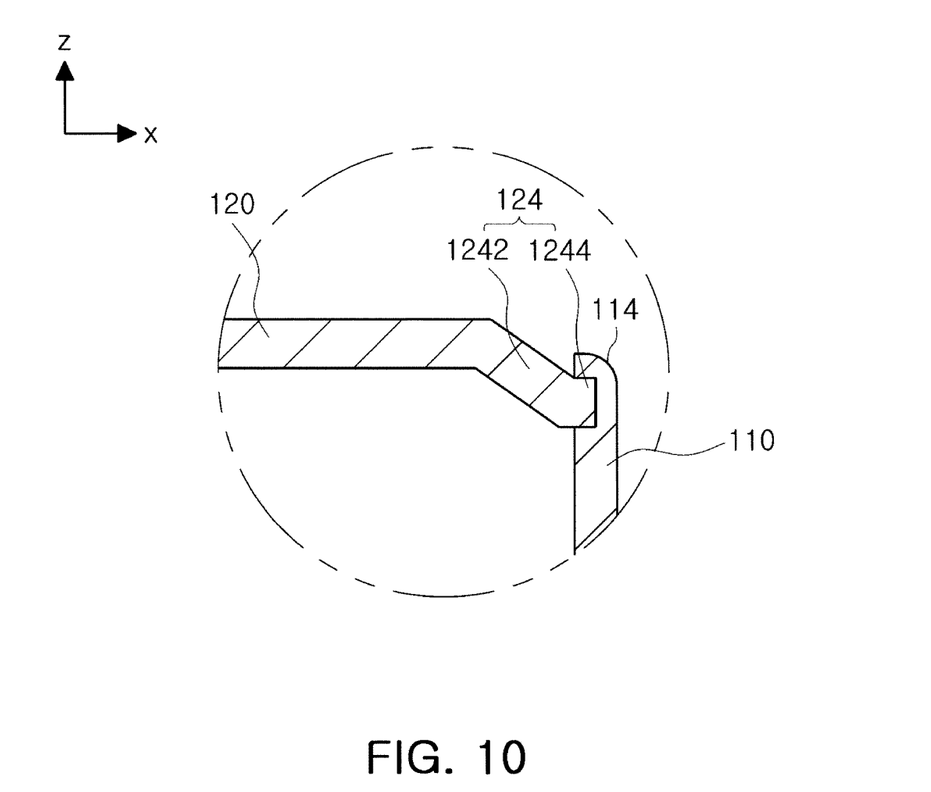
FIG. 10 is an enlarged cross-sectional view showing a state of part B shown in FIG. 7 after curling.

FIG. 1 is a cross-sectional view of a vibration motor according to an embodiment of the present invention; FIG. 2 is an assembled perspective view showing a state of the vibration motor shown in FIG. 1 before curling; FIG. 3 is an enlarged cross-sectional view of part A shown in FIG. 1; FIG. 4 is an assembled perspective view showing a state of the vibration motor shown in FIG. 1 after curling; FIG. 5 is an enlarged cross-sectional view showing a state of part A shown in FIG. 1 after curling; FIG. 6 is a graph showing a relationship between a height of an extension part and unmating force described in Table 2; FIG. 7 is a cross-sectional view of a vibration motor according to another embodiment of the present invention; FIG. 8 is an assembled perspective view showing a state of the vibration motor shown in FIG. 7 before curling; FIG. 9 is an enlarged cross-sectional view of part B shown in FIG. 7; and FIG. 10 is an enlarged cross-sectional view showing a state of part B shown in FIG. 7 after curling.

A vibration motor 100 according to an embodiment of the present invention may include a housing 110, a cover 120, an elastic member 130, a permanent magnet 140, a coil 150, a mass member 160, and a (flexible) circuit board 170. In addition, the vibration motor 100 may further include impact absorbing members 180 and 182.

The housing 110 may have a container shape in which it has a receiving space formed therein. For example, the housing 110 may have a cylindrical shape in which it has one open surface. However, this is only an example, and a shape of the housing 110 is not specifically limited. That is, the housing 110 may have a shape other than cylindrical.

The housing 110 may include a mounting part 112. The mounting part 112 may be formed on a bottom surface of the housing 110 and fix the permanent magnet 140. For example, the mounting part 112 may have a protrusion, protruded from a bottom surface of the housing 110 to a predetermined height. For reference, the mounting part 112 may have an adhesive applied thereto in order to stably fix the permanent magnet 140 to the housing 110.

The housing 110 may be formed of a metallic material. For example, the housing 110 may be formed of a cold rolled steel sheet (SPCC) or stainless steel. The housing 110 formed of the above-described material may effectively protect components received therein from an external impact. Meanwhile, the above-mentioned material is only an example, and a material of the housing 110 is not limited. Therefore, the housing 110 may be formed of other materials having physical properties equal or similar to those of the cold rolled steel sheet or stainless steel.

The housing 110 may include an extension part 114 as shown in FIGS. 2 and 3. The extension part 114 may be formed on the one open surface of the housing 110 and be protruded lengthwise in a height direction (a Z axis direction, based on the accompanying drawings) of the housing 110. Here, the extension part 114 may be a part of the housing 110 extended upwardly of a bottom surface of the cover 120 in a state in which the housing 110 and the cover 120 are coupled to each other.

The extension part 114 may have a thickness equal to a thickness T1 of the housing 110. However, the extension part 114 may have a thickness less than the thickness T1 of the housing 110 so that the compression work (particularly, the curling work) may be easily performed.

The extension part 114 may have a first part 1142 and a second part 1144.

The first part 1142 may be a part contacting an end surface of the cover 120. That is, the first part 1142 may be a part of the housing 110 substantially enclosing a circumference of the cover 120. Here, a height h1 of the first part 1142 is equal to or greater than a thickness T2 of the cover 120.

The second part 1144 may be a part except for the first part 1142 in the extension part 114. Here, the second part 1144 may be a part of the housing 110 extended upwardly of an upper surface of the cover 120 in a state in which the housing 110 and the cover 120 are coupled to each other. Here, a height h2 of the second part 1144 may be less than the height h1 of the first part 1144 and be equal to or greater than the thickness T1 of the housing 110.

The extension part 114 formed as described above may have a predetermined height h (h1+h2) and cover an edge of the cover 120 through a curling process as shown in FIGS. 4 and 5.

Meanwhile, the height h of the extension part 114 may be selected from the following range. The following Table 1 shows several experiment numerals of a height h of the extension part 114 and a height h2 of the second part 1144, and the following Table 2 shows a relationship between a height of the extension part 114; 1142 and 1144 and unmating force. For reference, in the present specification, unmating force refers to a magnitude of force required for forcibly separating the cover 120 compressed with the housing 110 from the housing 110.

TABLE 1

| Note | h (=h1 + h2) | h2 |
|---|---|---|
| Experimental Example 1 | 0.30 | 0.10 |
| Experimental Example 2 | 0.32 | 0.12 |
| Experimental Example 3 | 0.34 | 0.14 |
| Experimental Example 4 | 0.36 | 0.16 |
| Experimental Example 5 | 0.38 | 0.18 |

An experiment was performed while changing a height h of the extension part 114 and a height h2 of the second part 1144 as shown in Table 1, and an optimal amount of coupling force between the housing 110 and the cover 120 was determined through the experiment.

That is, in the respective Experimental Examples, heights of the second part 1144 were set to be different according to heights h of the extension part 114, and unmating force of the cover 120 was determined through the experimentation (for reference, in the present experiment, a thickness T2 of the cover 120 may be substantially equal to a height h1 of the first part 1142). For example, a ratio of a height of the second part 1144 to the total height h of the extension part 114 was 0.33% in Experimental Example 1, 0.28% in Experimental Example 2, 0.41% in Experimental Example 3, 0.44% in Experimental Example 4, and 0.47% in Experimental Example 5.

TABLE 2

| | Unmating Force (kgf/mm) | | |
|---|---|---|---|
| Note | Min | Max | Max − Min |
| Experimental Example 1 | 3.16 | 4.24 | 1.08 |
| Experimental Example 2 | 5.32 | 6.39 | 1.07 |
| Experimental Example 3 | 7.42 | 7.77 | 0.35 |
| Experimental Example 4 | 8.13 | 8.27 | 0.14 |
| Experimental Example 5 | 8.17 | 8.38 | 0.21 |

In the experiment results, it was confirmed that unmating force in Experimental Examples 3 to 5 is relatively larger than unmating force in Experimental Examples 1 and 2. Particularly, it was confirmed that a difference between minimum unmating force and maximum unmating force is relatively small in Experimental Examples 3 and 4 (See FIG. 6). Therefore, it may be confirmed that an optimal ratio of the height of the second part 1144 to the total height h of the extension part 114 is in the range of 0.40 to 0.45%.

In addition, the height h of the extension part 114 may satisfy Equation 1. For reference, in Equation 1, the height h of the extension part 114 may be h1+h2.

$$0.13 \text{ mm} < h - T2 < 0.50 \text{ mm} \qquad \text{Equation 1}$$

As the height of the extension part 114 is increased, unmating force is correspondingly increased. However, when the height of the extension part 114 exceeds a maximum value of Equation 1, a wrinkle may be formed in the extension part 114 during the curling process. On the other hand, when the height of the extension part 114 is less than a minimum value of Equation 1, the extension part 114 may not be stably compressed with the cover 120.

Therefore, in order to firmly couple the housing 110 and the cover 120 to each other, the height of the extension part 114 may be set to satisfy Equation 1.

The cover 120 may be disposed on the one open surface of the housing 110 and close the one open surface. To this end, the cover 120 may have a cross-sectional shape with a size equal to that of the one open surface.

The cover 120 may be formed of a metallic material. For example, the cover 120 may be formed of a cold rolled steel sheet or stainless steel, similar to the housing 110. However, the cover 120 is not limited to being formed of the above-mentioned material, but may be formed of other materials.

The cover 120 may include a protrusion part 122 extended in one direction (an −X axis direction based on FIG. 2). The protrusion part 122 may support the circuit board 170 extended outwardly of the housing 110. Meanwhile, although a separate reference numeral is not used in the accompanying drawings, a groove through which the protrusion part 122 may be extended may be formed in the housing 110.

The elastic member 130 may be formed in the housing 110. More specifically, the elastic member 130 may have one end fixed to the housing 110 and the other end connected to a bracket 162. The elastic member 130, disposed as described above, may always return the bracket 162, moving in a vertical direction (a Z axis direction based on FIG. 1) by external force, to its original position.

The elastic member 130 may be formed of a coil spring. However, the elastic member 130 is not limited to being formed of the coil spring. For example, the elastic member 130 may be formed of a leaf spring or other springs.

The permanent magnet 140 may be disposed on the mounting part 112. The permanent magnet 140 may be disposed at the center of the elastic member 130 and allow the bracket 162 to vibrate in the vertical direction through interaction with the coil 150.

The permanent magnet 140 may be provided with a yoke 142. The yoke 142 may allow magnetic flux formed by the interaction between the permanent magnet 140 and the coil 150 to flow smoothly. The yoke 142 may have a plate shape and may be formed of a magnetic material. For reference, the yoke 142 may be fixed to the permanent magnet 140 by an adhesive, or the like.

The coil 150 may be formed on the bracket 162. For example, the coil 150 may be adhered to the bracket 162 or wound around the bracket 162.

The coil 150 may be electrically connected to the circuit board 170 and form a magnetic field through current supplied from the circuit board 170. Here, a magnitude and a direction of the magnetic field formed by the coil 150 may be changed according to a magnitude and a direction of the current supplied from the circuit board 170.

The coil 150 may reciprocate the bracket 162 in the vertical direction (the Z axis direction based on FIG. 1) through the interaction with the permanent magnet 140 to generate vibrations having a predetermined frequency. Here, the frequency may be adjusted by a spring constant of the elastic member 130 and mass of the mass member 160.

The coil 150 may have a hole larger than a cross-sectional shape of the permanent magnet 140. Therefore, when the bracket 162 moves downwardly, the permanent magnet 140 may be disposed in the coil 150.

The mass member 160 may be formed on the bracket 162 and move in the vertical direction together with the bracket 162.

The mass member 160 may be formed of a material having a predetermined mass. For example, the mass member 160 may be formed of a metallic material. However, the mass member 160 is not limited to being formed of the metallic material, but may be formed of other materials.

For reference, although the mass member 160 and the bracket 162 are shown as separated members in the accompanying drawings, the mass member 160 and the bracket 162 may be formed integrally with each other as needed.

The circuit board 170 may be disposed on the cover 120. The circuit board 170 may be electrically connected to the coil 150 and supply current to the coil 150.

The circuit board 170 may be extended outwardly of the housing 110 through the protrusion part 122. Here, the extended part of the circuit board 170 may be provided with a terminal connected to an external device.

The circuit board 170 may be a flexible board that may freely move. For example, the circuit board 170 may be manufactured in a film form. Since the circuit board 170 having this form may move freely, the circuit board 170 may stably maintain a state in which it is connected to the coil 150 regardless of vertical movement of the bracket 162.

The impact absorbing members 180 and 182 may be formed on the housing 110 and the cover 120. More specifically, a first impact absorbing member 180 may be formed along the circumference of the mounting part 112, and a second impact absorbing member 182 may be formed on one surface (a lower surface based on FIG. 1) of the cover 120.

Here, the first impact absorbing member 180 may block the housing 110 and the bracket 162 from being indirect contact with each other at the time of downward movement of the bracket 162. In addition, the second impact absorbing member 182 may block the bracket 162 and the cover 120 from being in direct contact with each other at the time of upward movement of the bracket 162.

The vibration motor 100 formed as described above may stably protect internal components from an external impact since the housing 110 and the cover 120 are firmly coupled to each other by curling.

Hereinafter, a vibration motor according to another embodiment of the present invention will be described with reference to FIGS. 7 through 10.

A vibration motor 100 according to another embodiment of the present invention may be different from the vibration motor 100 according to the previous embodiment of the present invention in terms of the shapes of a housing 110 and a cover 120.

The housing 110 may have a step 116 as shown in FIG. 9. The step 116 may be formed at a boundary at which an inner wall of the housing 110 and an extension part 114 are connected to each other. The step 116 formed as described above may stably support an edge of the cover 120. In addition, the step 116 may firmly fix the edge of the cover 120 to the extension part 114 after curling.

The cover 120 may include an inclined part 1242 and a flat part 1244. More specifically, the edge 124 of the cover 120 may include the inclined part 1242 and the flat part 1244 as shown in FIGS. 8 and 9. The inclined part 1242 may be bent downwardly from a body of the cover 120, and the flat part 1244 may be extended from an end of the inclined part 1242 in a horizontal direction.

Here, the flat part 1244 of the cover 120 may be covered by the extension part 114, and the inclined part 1242 of the cover 120 may contact an end portion of the extension part 114. Therefore, the cover 120 according to the present embodiment may be relatively firmly coupled to the extension part 114.

In the vibration motor 100 configured as described above, a gap between a surface of the cover 120 and the extension part 114 is reduced, in a state in which the housing 110 and the cover 120 are coupled to each other (See FIG. 10), whereby air tightness and coupling force between the housing 110 and the cover 120 may be significantly improved.

Meanwhile, although the permanent magnet 140 is formed in the housing 110 and the coil 150 is formed on the cover 120 in the accompanying drawings, positions of these members may be reversed.

That is, according to another embodiment of the present invention, the coil 150 may be formed in the housing 110 and the permanent magnet 140 may be formed on the cover 120.

As set forth above, according to embodiments of the present invention, a housing and a cover may be firmly coupled to each other. Therefore, vibration characteristics of a vibration motor may be constantly maintained.

While the present invention has been shown and described in connection with the embodiments, it will be apparent to those skilled in the art that modifications and variations can be made without departing from the spirit and scope of the invention as defined by the appended claims.

What is claimed is:

1. A vibration motor comprising:
a housing having one open surface;
a permanent magnet disposed in an internal space of the housing and interacting with a coil to generate electromagnetic force;
an elastic member formed in the housing;
a mass member coupled to the elastic member to perform resonant movement through the electromagnetic force;
a cover covering the one open surface of the housing; and
an extension part extended from the one open surface of the housing in a height direction thereof and compressed with the cover to closely attach the housing and the cover to each other,
wherein the extension part is compressed with the cover by curling.

2. The vibration motor of claim 1, wherein the extension part is continuously protruded along an edge of the one open surface of the housing.

3. The vibration motor of claim 1, wherein the housing has a step supporting the cover.

4. The vibration motor of claim 1, wherein the extension part has a relatively smaller thickness than that of the housing so as to be easily compressed with the cover.

5. The vibration motor of claim 1, wherein a height h of the extension part satisfies the following Equation 1:

$$0.13 < h - T2 < 0.50 \qquad \text{Equation 1}$$

where T2 indicates a thickness of the cover.

6. The vibration motor of claim 1, wherein the housing is formed of stainless steel or a cold rolled steel sheet.

7. The vibration motor of claim 1, wherein the cover has an inclined surface contacting an end portion of the extension part in a state in which the cover is coupled to the housing.

8. The vibration motor of claim 1, wherein the cover includes a protrusion part protruded in a radial direction.

9. The vibration motor of claim 8, wherein the housing has a groove into which the protrusion part is fitted.

10. A vibration motor comprising:
a housing having one open surface;
a permanent magnet disposed in an internal space of the housing and interacting with a coil to generate electromagnetic force;
a cover covering the one open surface of the housing;
an elastic member formed on the cover;
a mass member coupled to the elastic member to perform resonant movement through the electromagnetic force; and
an extension part extended from the one open surface of the housing in a height direction thereof and compressed with the cover to closely attach the housing and the cover to each other,
wherein the extension wart is compressed with the cover by curling.

11. The vibration motor of claim 10, wherein the extension part is continuously protruded along an edge of the one open surface of the housing.

12. The vibration motor of claim 10, wherein the housing has a step supporting the cover.

13. The vibration motor of claim 10, wherein the extension part has a relatively smaller thickness than that of the housing so as to be easily compressed with the cover.

14. The vibration motor of claim 10, wherein a height h of the extension part satisfies the following Equation 1:

$$0.13 < h - T2 < 0.50 \qquad \text{Equation 1}$$

where T2 indicates a thickness of the cover.

15. The vibration motor of claim 10, wherein the housing is formed of, stainless steel or a cold rolled steel sheet.

16. The vibration motor of claim 10, wherein the cover has an inclined surface contacting an end portion of the extension part in a state in which the cover is coupled to the housing.

17. The vibration motor of claim 10, wherein the cover includes a protrusion part protruded in a radial direction.

18. The vibration motor of claim 17, wherein the housing has a groove into which the protrusion part is fitted.

* * * * *